US009407742B2

(12) United States Patent
Noble Nava

(10) Patent No.: US 9,407,742 B2
(45) Date of Patent: Aug. 2, 2016

(54) CELL PHONE HOLSTER

(76) Inventor: Eduardo Alejandro Noble Nava, Middletown, CT (US)

( * ) Notice: Subject to any disclaimer, the term of this patent is extended or adjusted under 35 U.S.C. 154(b) by 0 days.

(21) Appl. No.: 13/602,271

(22) Filed: Sep. 3, 2012

(65) Prior Publication Data

US 2014/0073376 A1    Mar. 13, 2014

Related U.S. Application Data

(63) Continuation-in-part of application No. PCT/US2011/027098, filed on Mar. 3, 2011.

(60) Provisional application No. 61/309,918, filed on Mar. 3, 2010.

(51) Int. Cl.
| | |
|---|---|
| *H04M 1/00* | (2006.01) |
| *H04M 1/02* | (2006.01) |
| *A45F 5/00* | (2006.01) |
| *H04B 1/3827* | (2015.01) |
| *H04M 1/04* | (2006.01) |

(52) U.S. Cl.
CPC ............... *H04M 1/0279* (2013.01); *A45F 5/00* (2013.01); *H04B 1/385* (2013.01); *A45F 2005/008* (2013.01); *A45F 2200/0516* (2013.01); *H04B 2001/3861* (2013.01); *H04M 1/04* (2013.01)

(58) Field of Classification Search
CPC ........ H04B 1/385; H04B 1/3888; H04M 1/05
USPC ....................... 455/575.6, 575.8, 575.1, 550.1
See application file for complete search history.

(56) References Cited

U.S. PATENT DOCUMENTS

| | | | | |
|---|---|---|---|---|
| 5,003,637 | A | * | 4/1991 | Lonon ................................. 2/160 |
| 5,110,154 | A | * | 5/1992 | Street ............................... 280/822 |
| 5,864,884 | A | * | 2/1999 | Salvitti ............................... 2/159 |
| 2007/0083979 | A1 | * | 4/2007 | Daniels ............................. 2/160 |
| 2008/0084390 | A1 | * | 4/2008 | Jones ............................. 345/158 |

* cited by examiner

*Primary Examiner* — Nghi H Ly
(74) *Attorney, Agent, or Firm* — Bennett Intellectual Property; Allen F. Bennett

(57) ABSTRACT

A holster for a hand held device allows a cell phone or other device to be secured to the dorsal side of a hand and still visible while not in use. In this position it may be manipulated by one hand. When desired, the cell phone or other device may be rapidly repositioned into the palm of the hand. This allows fast access to and manipulation of a cell phone or other device, while also allowing it to be secured out of the way on the dorsal side of the glove.

12 Claims, 5 Drawing Sheets

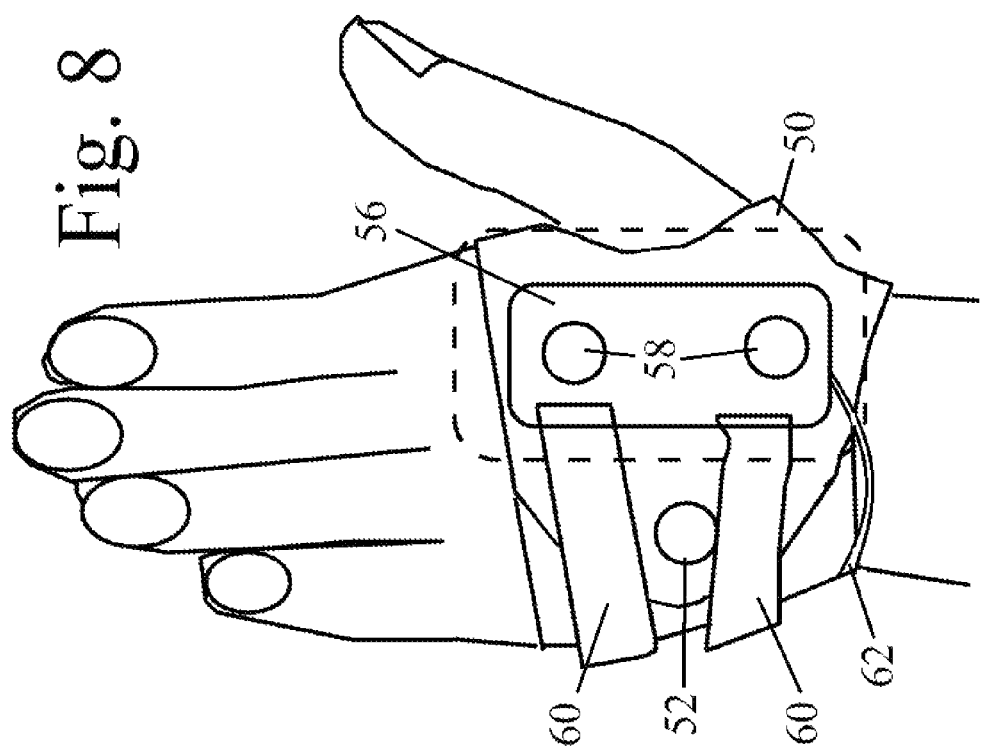
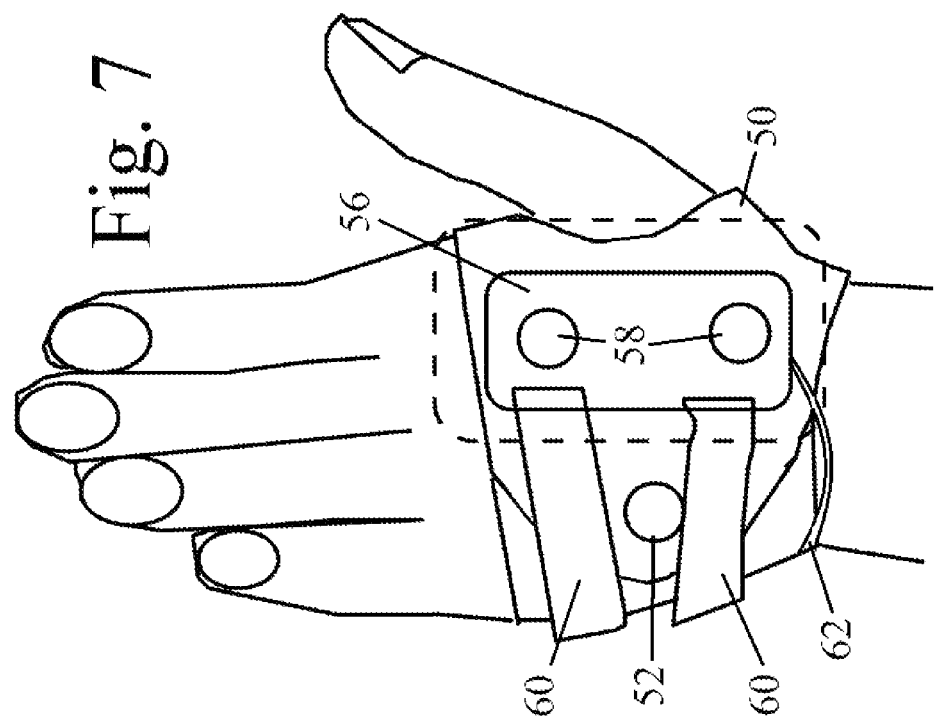

CELL PHONE HOLSTER

CROSS-REFERENCE TO RELATED APPLICATION

This application is related to and claims priority to PCT Application No. PCT/US2011/027098 filed on Mar. 3, 2011 and U.S. Provisional Patent Application No. 61/309,918 filed on Mar. 3, 2010.

STATEMENT REGARDING FEDERALLY SPONSORED RESEARCH OR DEVELOPMENT

Not Applicable

FIELD OF THE INVENTION

The present invention relates to a method and system for securing a smart phone, PDA, touchscreen device, GPS or other device in a position that allows quick access, manipulation. and usability. The invention keeps a device in view of the user while he or she engages in activities that require the use of one or both hands. Specifically, the invention provides a holster for a cell phone or other hand held device for positioning the device on the dorsal side of a hand. This placement allows the device to be used, viewed, and manipulated if the hands are otherwise engaged. The invention also allows the device to be quickly transferred into the palm when needed for use as a phone.

BACKGROUND OF THE INVENTION

Cell phones, cameras, PDAs, Ipods® and other hand held electronic devices have become ubiquitous in our society and often include a touch screen and entertainment features. Many prefer to keep cell phones, cameras and other devices with them and within view at all times. Owners of these devices often prefer to store these devices in locations that are both out of the way and in sight and readily accessible. With phones having more and more applications, there is a need for using these devices in a greater number of situations and a need to have a holstering or docking device that is designed for each situation—one for the car, one on the upper arm while exercising etc. The invention provides a solution to having multiple docking stations. The invention allows replacement of all other docking and holstering devices with one device that replaces them and allows an extra level of connectedness. A need has arisen and will continue increase, to integrate these devices and their many applications and functionalities into our lives and routines.

Many women store their cell phones and other devices in a purse. However, many other items are stored in a purse and the hand held device may easily become lost in a purse. Similarly, backpacks and other carrying cases may be acceptable devices in which to store items, but they rarely provide quick access. As a result, phone calls are not answered and photographs are not captured or extra attention is diverted to finding, and/or activating the phone.

Various holsters and carrying cases have been developed for cell phones, and many of them are designed to protect devices from impact due to falling. These holster and cases may be slung around a person's neck, attached to a bracelet type cord and carried about the wrist, or attached to a belt or other web. While these may be superior storage devices to a purse or backpack, they still suffer disadvantages. Many require both hands and eye contact and extraction from a case in order to remove or detach the device and manipulate it. Devices are often dropped as a result. In addition, these holster and carrying cases are particularly cumbersome for people riding bikes or in wheelchairs. This may be both time consuming and distracting. and damaging to device. These devices may also require other hand held items to be dropped, set down or stored while the device is being accessed. Other holsters, such as those worn on a belt, may have a funny appearance and may be inconvenient when sitting, especially in small seats such as an airplane or a movie theatre. There is thus a need for a holstering device that allows it to be viewed while hands are engaged, such as when using a computer or driving.

It is therefore desirable to provide a holster for hand held devices that provides quick access that does not require extraction or both hands or direct eye contact with the device.

It is also desirable to provide a device for maintaining a hand held device in sight while seamlessly transitioning from one activity to another, for example transitioning from driving to working on a computer without having to remove the phone from one holster and placing it in another.

SUMMARY OF THE INVENTION

The present invention advantageously provides a method and system for a PDA, Ipod®, GPS, cell phone, or other hand held device holster and dock comprising a glove having a palmar side, a dorsal side and a fastening pad on the dorsal side, a plaque having an attachment pad and one or more tethers connecting the glove to the holster. The back fastening pad of the plaque may be affixed to the dorsal fastening pad of the glove and the tether allows the plaque to be positioned on the palm of the glove. When both in the palm and on the dorsal side of the glove, the device is not covered buy may be viewed and manipulated.

In one embodiment, a holster for securing a handheld device comprises a glove having a dorsal side and a fastening pad on the dorsal side, a plate having an fastening pad, and one or more tethers connecting the glove to the holster. The attachment pad of the holster may be removably affixed to the dorsal fastening pad. The one or more tethers allow the hand held device to be transferred between a palm of an operator's hand and the dorsal side of the glove by rapid rotation of the operator's wrist.

The device attached to the holster may be a cell phone. The holster of claim 1 wherein the fastening and attachment pads are magnetic. The holster may have fastening that are Velcro. The tethers may be adjustable. The fastening pads may comprise two or more fastening pads. The tether may be attached to a palmar side of the glove. The holster may also comprise one or more adjustable straps.

In another embodiment, a holster for securing a hand held device may comprise a glove having a dorsal side and a fastening pad on the dorsal side, a holster having an attachment pad, and one or more tethers connecting the glove to the holster. The attachment pad of the holster may be removably affixed to the dorsal fastening pad. The one or more tethers allow the hand held device to be transferred between a palm of an operator's hand and the dorsal side of the glove by rapid rotation of the operator's wrist. The tether and straps may be adjustable. The fastening pads may comprise two or more fastening pads. The tether is attached to a palmar side of the glove.

In another embodiment, a method for adjusting the location of a hand held device may comprise providing a glove having a dorsal side to which a hand held device may be removably attached, and providing one or more tethers connecting the hand held device to the glove. The hand held device may be detached from the dorsal side of the glove by a rapid rotation of the wrist such that the hand held device is delivered into a palm of an operator's hand. The glove and the device may be removably attached by pads. The tethers may cause device to travel about the medial side of the operator's hand. The tethers may cause device to travel about the lateral side of an operator's hand. The device may be removably attached to the dorsal side of the glove such that it may be observed and manipulated by the operator.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

FIG. 7 is a dorsal view of an alternative embodiment of a holster in accordance with the principles of the invention;

FIG. 8 is a palmar view of an alternative embodiment of a holster in accordance with the principles of the invention;

DETAILED DESCRIPTION OF THE INVENTION

Figure 1:
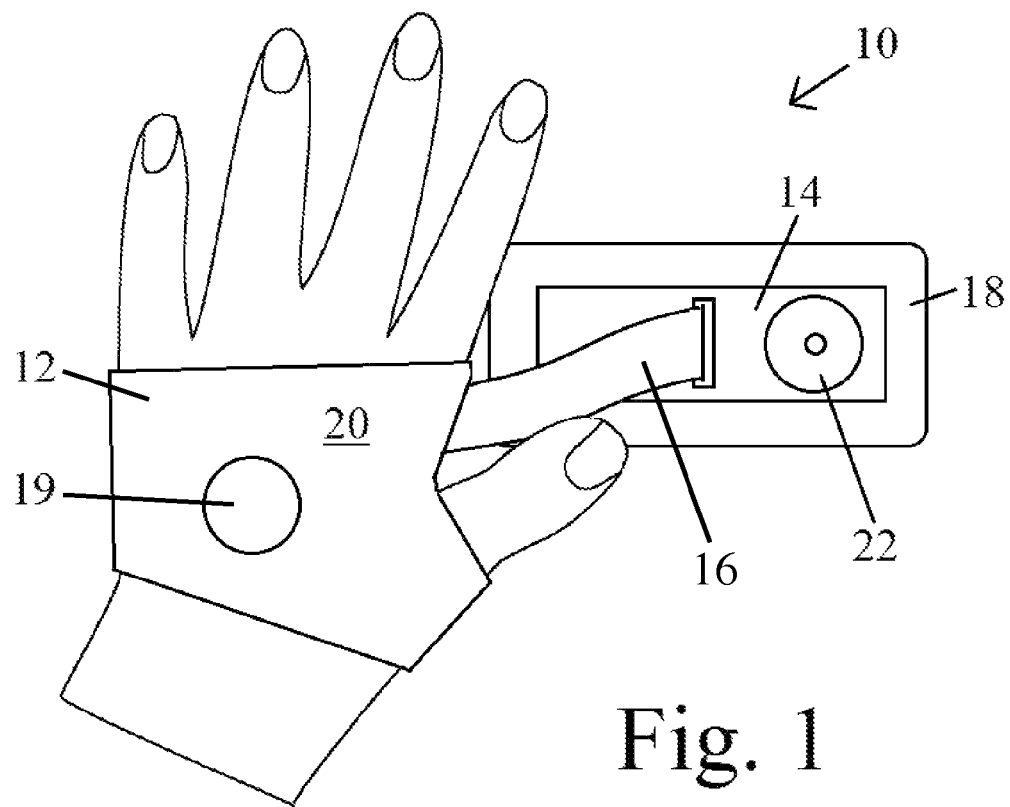
FIG. 1 is a dorsal view of a holster with a cell phone not engaged to the dorsal side of the holster in accordance with the principles of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring to FIGS. 1-4, a cell phone holster in accordance with the principles of the invention is shown generally as 10. A plate 14 may be connected by a tether 16 to the palmar side 26 of the glove 12. The plate 14 may be attached to a hand held device 18. In this embodiment, the hand held device 18 may be a cell phone such as an Iphone®, however, any hand held device may be used in accordance with the principles of the invention. The tether may be elastic or substantially non-elastic but flexible.

The glove 12 may have a fastening pad 19 incorporated within it on the dorsal side 20 of the glove 12. The plate 14 may have a corresponding fastening pad 22. The corresponding fastening pads 19 and 22 may be complimentary and bind to each other. In this embodiment, fastening pad 19 and attachment pad 22 may be magnets. When the fastening pads 19 and 22 come into contact with one another and become engaged, they may hold the plate 14 and device 18 securely on the dorsal side 20 of the glove 12. Fastening pads 19 and 22 may be comprised of any mechanism that provides for detachable engagement, such as for example magnets, hook and loop, tongue and groove, snapping, or a twisting mechanism that attaches and detaches upon rotation.

Figure 2:
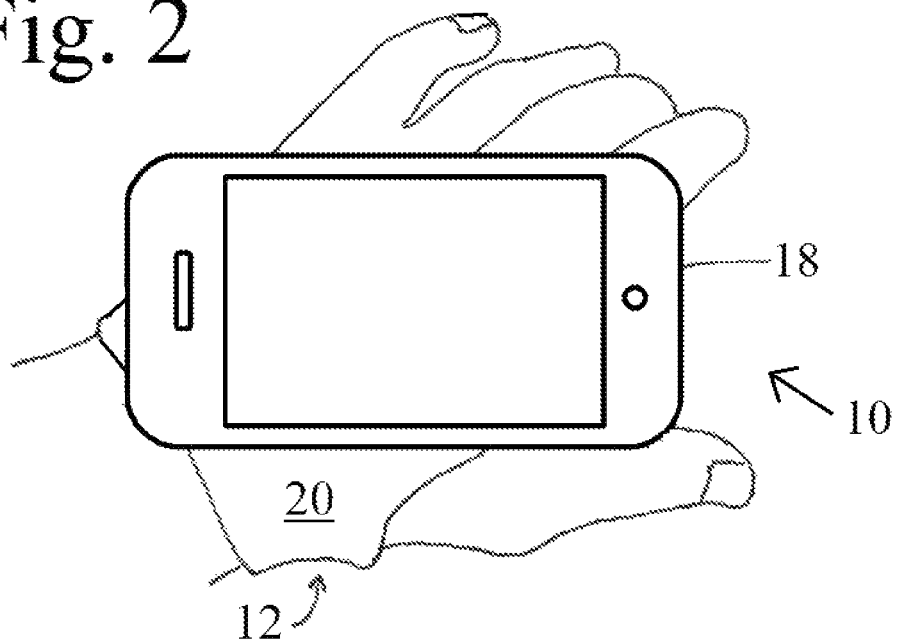
FIG. 2 is a dorsal view of a holster with a cell phone engaged with the dorsal side of the holster in accordance with the principles of the invention.

FIG. 2 shows the device 18 secured to the dorsal side 20 of the glove 12. When in this position, the tether 16 may lie between the thumb and forefinger and the plate 14 may be affixed to the dorsal fastening pad 19. Device 18 is secured in a position that provides quick access and a clear line of sight to device while engaged in activities such as typing or driving. and may be moved to the palm of the palmar side of the hand by a flick of the wrist and without the use of either hand or extraction from a purse or case.

Figure 3:
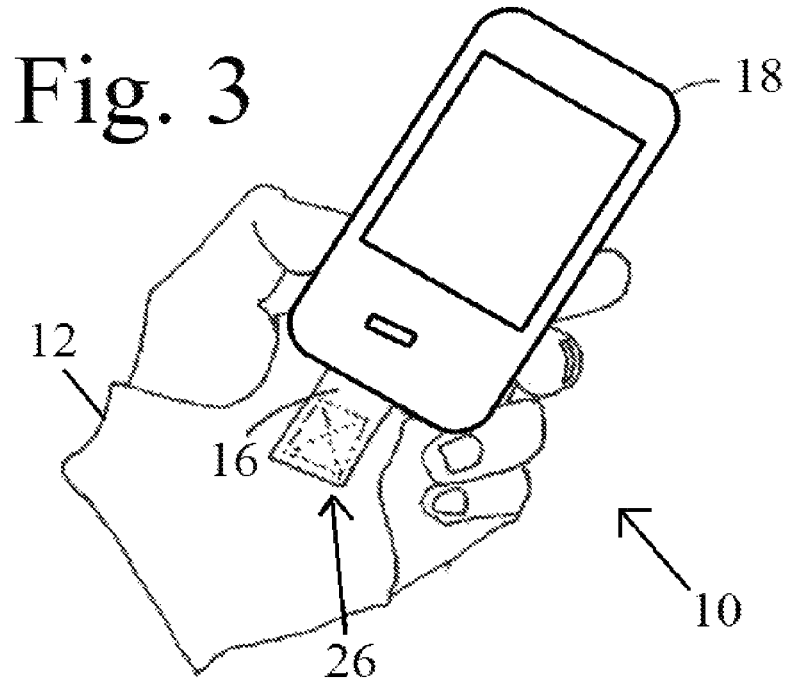
FIG. 3 is a palmar view of a holster with a cell phone engaged with the palmar side of the holster in accordance with the principles of the invention.

FIG. 3 shows the device 18 in the palm of an operator. In this position, the operator may manipulate the device 18 while it may be still attached to the plate 14 by the tether 16. The tether may be attached to the palm side 26 of the glove 12. When the device 18 is in the palm of the operator, the tether 16 may be folded over on itself. In this embodiment, the tether 16 may allow the device 18 to travel between the palm and the dorsal side of the operator. The tether 16 may be stitched to or otherwise attached to the palm 26 of the glove 12 approximately in the thenar region of the glove 12. However, the tether 16 may be attached to the glove at many other locations. The tether may be easily detached from the plate 14 using quick-release buckles or other quick release devices. This allows the device to be readily detached from the holster/dock device so that others may use it or for other purposes.

Figure 4:
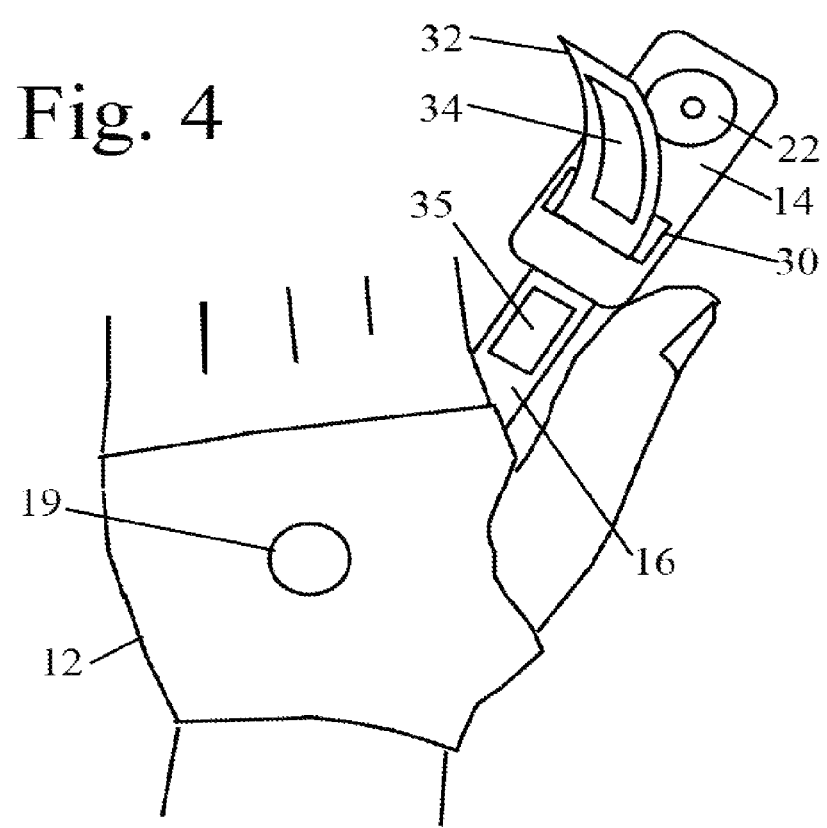
FIG. 4 is a perspective view of a holster have a lock in accordance with the principles of the invention.
Figure 5:
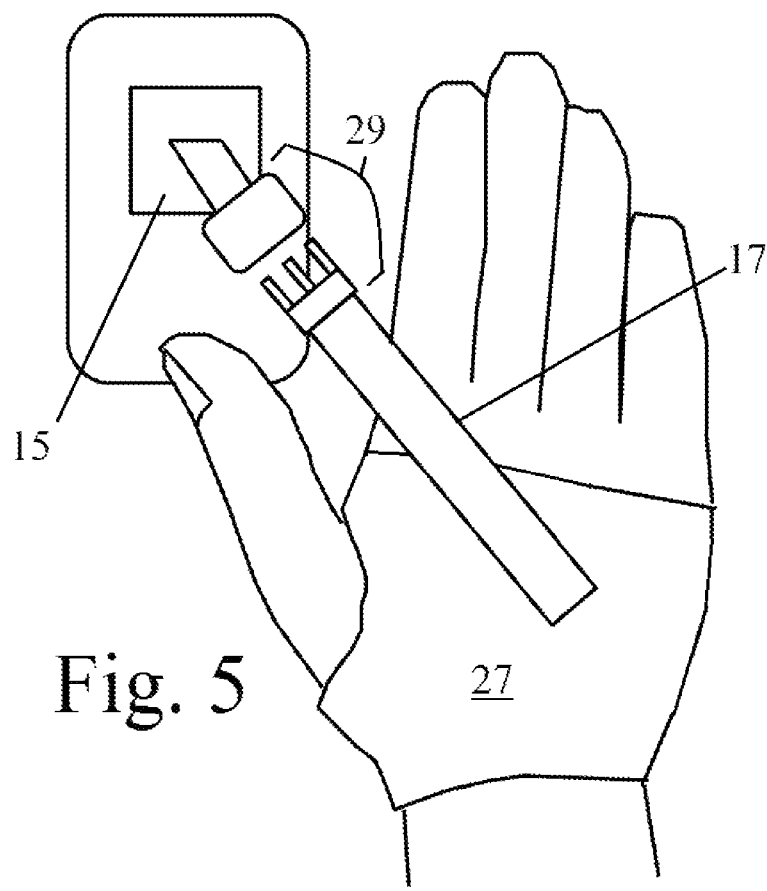
FIG. 5 is a perspective view of an alternative embodiment of a holster in accordance with the principles of the invention.

FIG. 4 shows the glove 12, tether 16 and plate 14. Here, it can be seen that plate 14 may have a slot 30 through which the distal end 32 of the tether 16 may pass. Tether 16 may be pulled through slot 30 and folded over on itself so that pads 34 and 35 come in contact and become secured to one another. In this embodiment, Velcro® may be used in pads 34 and 35 to allow them to connect easily and firmly. Other materials that allow for detachable connection and adjustment may also be used, such as for example the series of snaps as commonly found on baseball caps or other methods for adjustably securing a web type device to an object having a slot or lanyard. Pads 34 and 35 may be relatively long so that the operator may adjust the length of tether 16 and thus the distance it extends from the palm side 28 of the palm. Similarly, FIG. 5 illustrates a quick-release buckle 29 that may be used to attach plate 15 to tether 17.

In the embodiments shown in FIGS. 1-5, the tether is attached to the palmar side 26 of the glove 12. However, it may also be attached to the dorsal side of the glove, or to the region between the thumb and forefinger. Alternatively, the invention may provide a tether that allows travel around the medial or lateral sides of the hand instead of between the thumb and forefinger. Additional fastening and attaching pads may be used to provide more than one position on the dorsal side of the glove to which a plaque or case may be secured.

Figure 6:
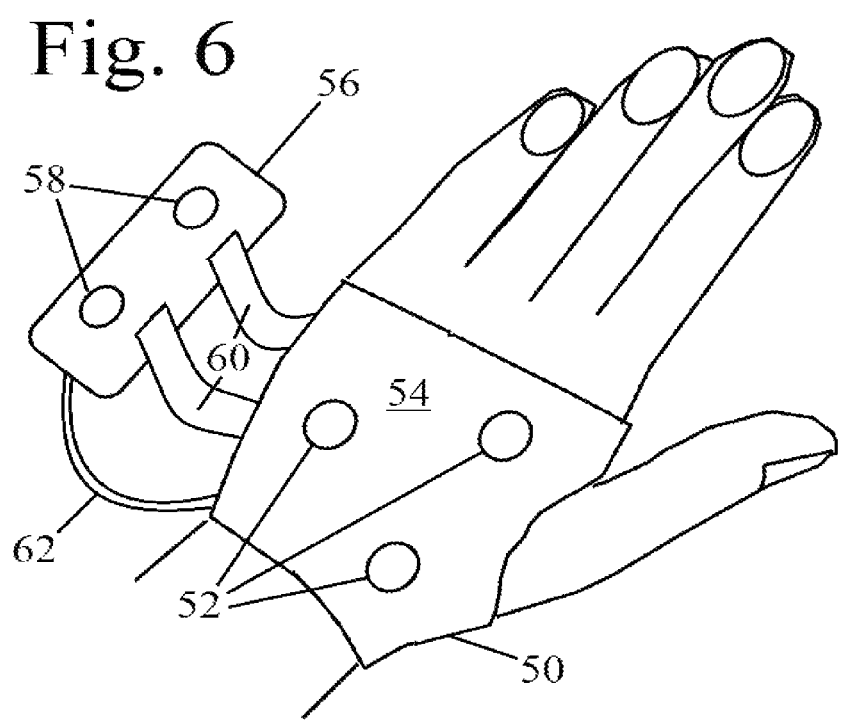
FIG. 6 is a dorsal view of an alternative embodiment of a holster in accordance with the principles of the invention.

FIGS. 6-8 show an alternative embodiment of a holster in accordance with the principles of the invention. Glove 50 has three fastening pads 52 on its dorsal side 54. Plate 56 may have one or two fastening pads 58 that are complimentary to the fastening pads 52. Having three fastening pads 52 on the dorsal side 54 of the glove 50 may allow the plate 56 to assume different configurations when engaged with the dorsal side 54 of the glove 50.

Plate 56 may be attached to the glove 50 by straps 60 and tether 62. In this embodiment, the tethers 60 may be attached to the palmar side 64 of the glove and the tether 62 may be attached to the medial side of the glove 50. Both the tethers 60 and the tethers 62 may be elastic and/or adjustable.

Figure 9:
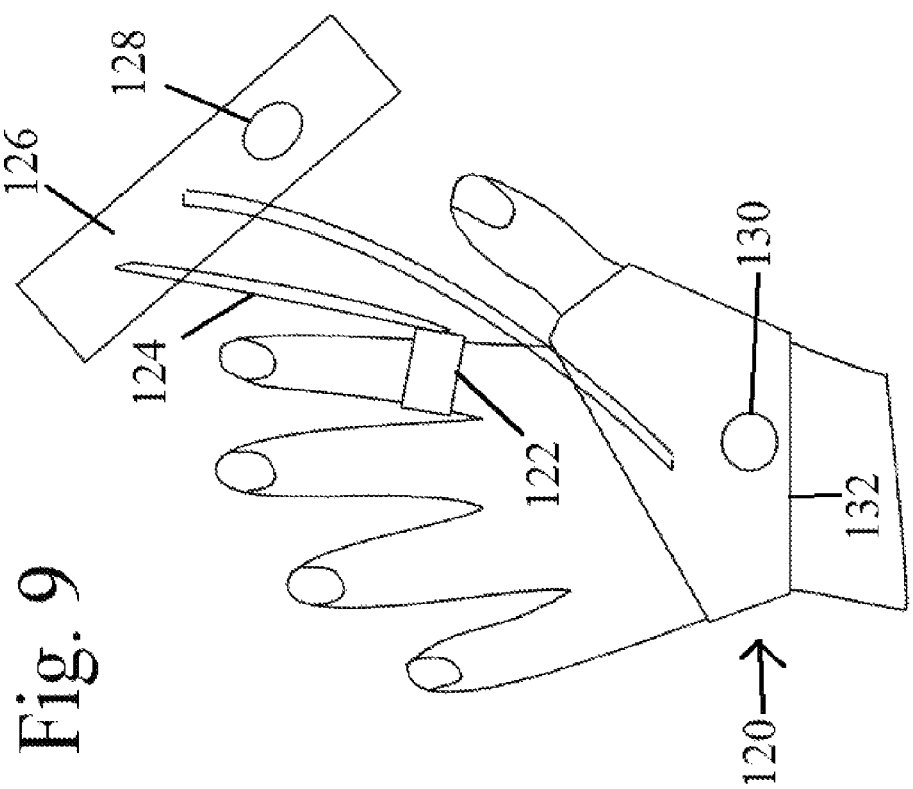
FIG. 9 is a dorsal view of an alternative embodiment of a holster in accordance with the principles of the invention.

FIG. 9 shows an alternative embodiment 80 that may include a ring 82 having a tether 84 connected to a plate 86. Plate 86 may include an fastening pad 88 that is complimentary to a fastening pad 90. Pad 90 may be incorporated into a simple band 92, rather than an entire glove. Band 92 may optionally be connected to the plate 86 by a tether 94. Neither, either or both of tethers 84 and 94 may be elastic.

Figure 10:
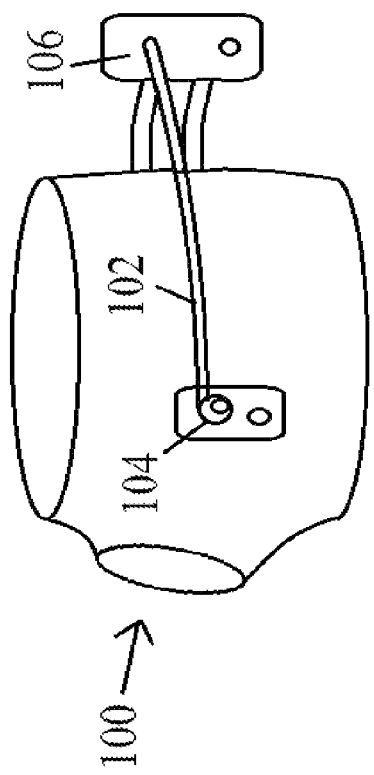
FIG. 10 is a dorsal view of an alternative embodiment of a holster in accordance with the principles of the invention.
Figure 11:
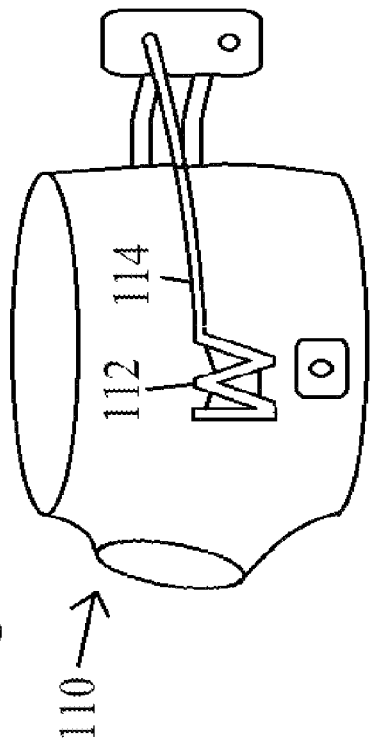
FIG. 11 is a dorsal view of another alternative embodiment of a holster in accordance with the principles of the invention.

FIG. 10 shows an embodiment 100 having a tether 102 connected to a spring 104 to assist the translocation of a plaque 106 from the palm to the dorsal side of the holster/dock. FIG. 11 shows an embodiment 110 having an alternative type of spring mechanism 112 attached to a tether 114.

During operation of the invention, the tethers and/or straps may allow a plate with attached cell phone or other device to be swung about the hand from the dorsal position to the palmar position by flicking the wrist. The force may pull the holster free from engagement with the fastening pads on the back of the hand. The motion may then cause a device to swing on the tether and/or straps in an arc and land in the palm of the hand. When in the palm, the device then may securely affix to a magnetic fastening pads on the palm of the glove or be simply held in position by the user. When manipulation of the device is no longer desired, or requires being held in a palm of a hand, the device may be returned to the back position by again flicking the wrist and swinging the device around to the dorsal side of the glove where may affix and can continue to be seen and manipulated by a user.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

The present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A holster for securing a handheld device comprising:
   a glove having a dorsal side and a fastening pad on the dorsal side;
   a plate having an attachment pad;
   one or more tethers connecting the glove to the plate;
   wherein the attachment pad of the holster may be removably affixed to the dorsal fastening pad;
   wherein the one or more tethers allow the hand held device to be transferred between a palm of an operator's hand and the dorsal side of the glove by rapid rotation of the operator's wrist.

2. The holster of claim 1 wherein the device is a cell phone.

3. The holster of claim 1 wherein the fastening and attachment pads are magnetic.

4. The holster of claim 1 wherein the fastening and attachment pads are Velcro.

5. The holster of claim 1 wherein the tethers are adjustable.

6. The holster of claim 1 wherein the fastening pads comprise two or more fastening pads.

7. The holster of claim 1 further comprising one or more adjustable straps.

8. The holster of claim 1 wherein the device is a cell phone.

9. The holster of claim 1 wherein the fastening and attachment pads are magnetic.

10. The holster of claim 1 wherein the fastening and attachment pads are Velcro.

11. The holster of claim 1 wherein the fastening and attachment pads are adjustable.

12. The holster of claim 1 wherein the fastening and attachment pads comprise two or more fastening pads and/or attachment pads.

* * * * *